April 18, 1967 F. C. MENDOZA ETAL 3,314,528
DOUGH BREAD BAKING BELTS
Filed Dec. 10, 1965 2 Sheets-Sheet 1
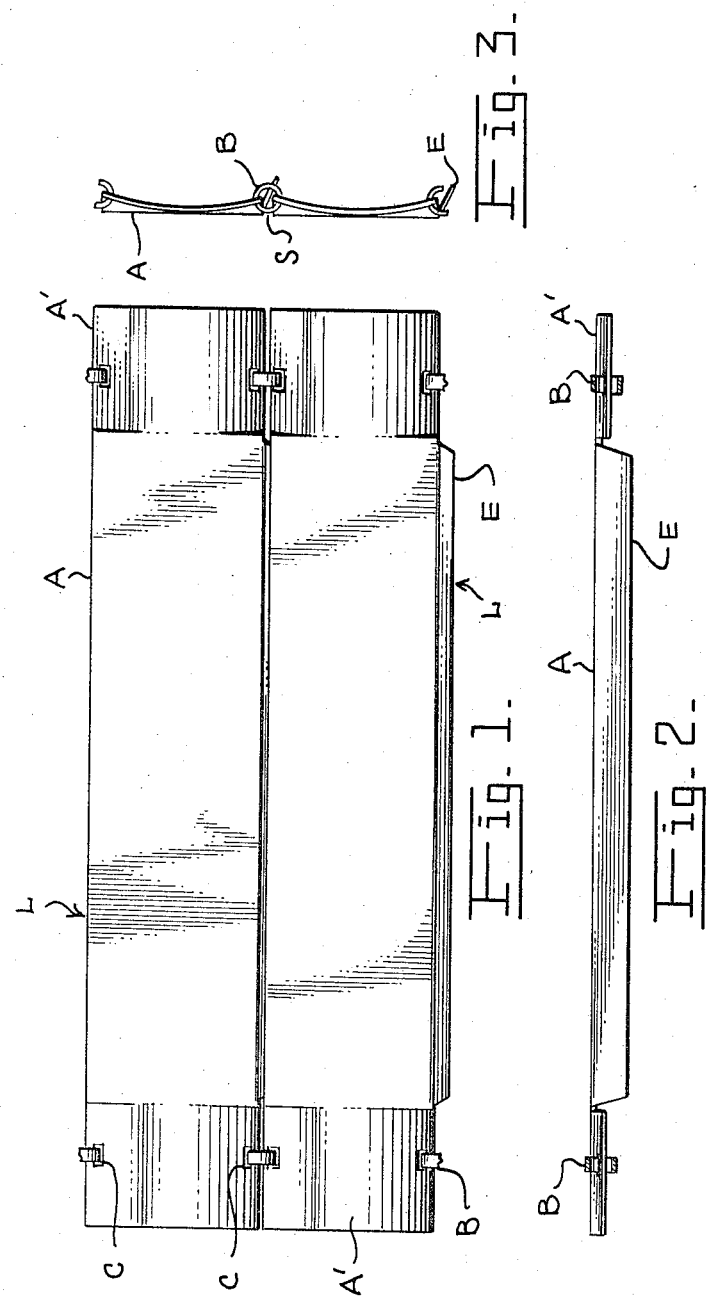
INVENTOR
FAUSTO CELORIO MENDOZA
BY
Mason, Fenwick & Lawrence
ATTORNEYS

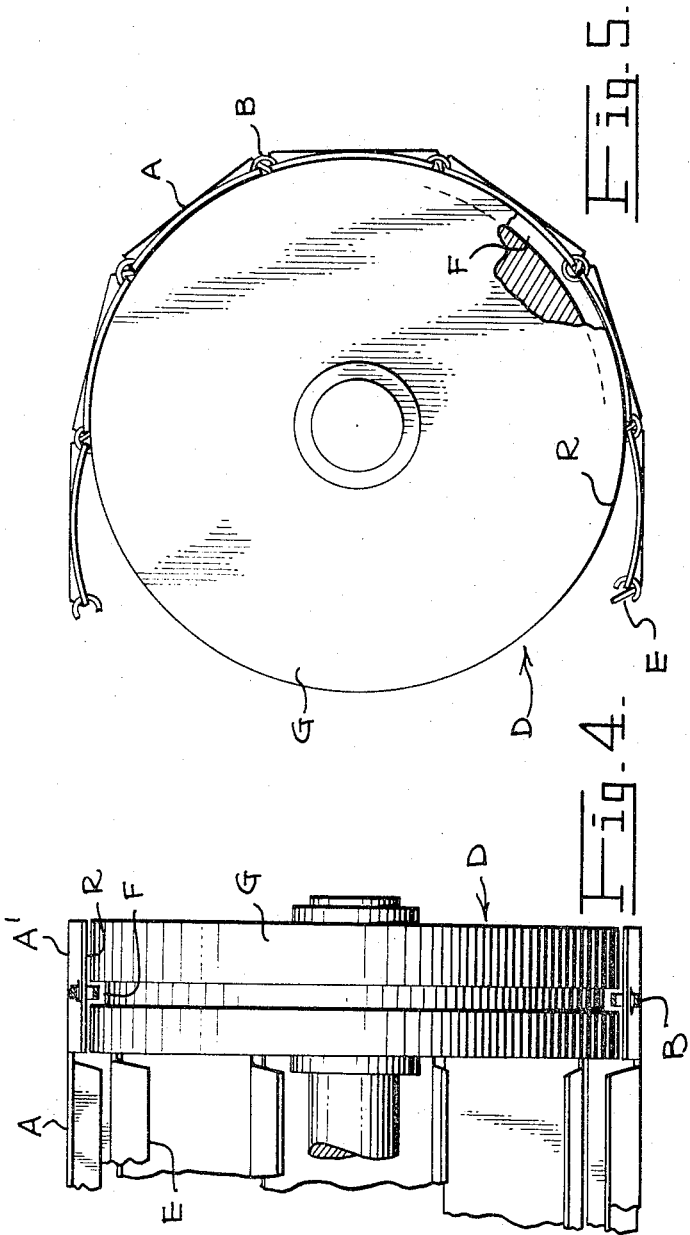

United States Patent Office 3,314,528
Patented Apr. 18, 1967

3,314,528
DOUGH BREAD BAKING BELTS
Fausto Celorio Mendoza, Cumbres de Acultzingo, near Mexico City, Mexico
Filed Dec. 10, 1965, Ser. No. 512,899
6 Claims. (Cl. 198—195)

The present invention refers to the art of preparing and baking dough breads, such as pancakes, biscuits, etc., made from Indian corn preparations, wheat, cereals, and other similar articles, and more particularly it is related with improvements in baking belts, which prevent an improper fuel consumption and which allow an absolutely uniform baking of said breads.

Until now, in all machines utilized for the preparation of dough breads, such as corn pancakes, biscuits, and the like, use has been made of metallic baking belts, introduced within furnaces of a proper nature, which in general have direct flame burners directed unto the said belt, on its lower surface, whereas on its upper surface the pancakes or similar articles are distributed in an aleatory manner, and these belts are formed by means of links having a radius of curvature equal to the radius of the rolls whereupon the belt is rotating, these links being composed of laminate material having the radius of curvature previously mentioned.

The links are joined by means of little metallic rings having a tabular shape and being introduced in perforations in the ends of said links, so that a complete chain is formed, which in its free planar stretches has an undulated or corrugated shape which becomes only uniform when reaching the zone of curvature, where it rotates around the previously stated cylinders or rolls. The above causes the ends of the link plates to become separated from each other, inducing the outlet of flames between the slits thus created, as a result of which the articles placed thereon are baked in a non-uniform way, while wasting a great portion of the heat as the flames are not retained in the lower surfaces of the plates which constitute the links.

The above has constituted a serious disadvantage in this kind of dough baking machines, of the kind with an endless belt, and this is the reason why for a long time a system has been looked for that in the first place prevents the outlet of the flames and which is able to adopt a completely planar configuration without slits or the like, in the free strands of the endless belt and which at the same time may adequately rotate around the cylinders or pulleys that move the said belt.

It is therefore an object of the present invention to provide an improved dough bread baking belt, which has a planar configuration in its central parts and curved in its ends, so as to adapt it for forming a completely planar surface in the free strands of the belt, whereas at the same time, it may adequately rotate around the pulleys that move the said belt.

Another object of the present invention is to provide a baking belt for dough breads, of the afore-mentioned nature, having on one of its edges of the planar surfaces an extended and downwards inclined shoulder, covering completely the free space existing between one link and the next one, so as to prevent the creating of slits and the passage of flames directly to the outer part of the belt.

Another object of the present invention is to provide a belt of the nature heretofore mentioned, wherein only the extreme portions that have a radius of curvature similar to that of the pulleys that drive the belt, are joined one to the other by means of small metallic rings, introduced through the orifices or openings registering appropriately from one laminated link to the other.

Other objects and advantages of the invention will become apparent to anyone skilled in the art, whereas others will appear when proceeding with the description of a particularly preferred embodiment of the invention, taken in connection with the accompanying drawings, wherein:

FIGURE 1 is an upper plan view of a pair of links conforming the baking belt of the present invention, clearly showing their planar portions and their curved portions, as well as the joint made by means of small metallic rings;

FIGURE 2 is a view in profile of a link constructed in accordance with the present invention, clearly showing its inclined shoulder or flame protecting shield;

FIGURE 3 is a side view in profile of the links shown in FIGURE 1, clearly illustrating the manner in which the various links are joined together by means of small rings, as well as the relative position of the flame protecting shield below the subsequent link;

FIGURE 4 is a fragmentary elevational view of a strand of the belt constructed in accordance with the present invention, rotating around one of the pulleys that drive the belt mentioned, clearly illustrating the manner in which the curved portions are positioned on the pulley, leaving a free space for the small joint-rings, and FIGURE 5 is a view in an angle of 90 degrees in regard to FIGURE 4, illustrating the same pulley and the railing of the belt thereon.

Referring now more particularly to the drawings, there is shown therein an improved belt, constructed in accordance with the present invention, and which has been conformed from a plurality of links L consisting of a planar laminated portion A, terminating on both ends in laminated curved portions, of the same width, designated by letter A', which have a radius of curvature equal to the radius of curvature of the rolls or pulleys D, around which the said belt is rotating so as to become coupled thereon.

The curved portions A' of the laminated links, which constitute the belt of the present invention, are provided with opening C, through which pass the suitable connectors, such as the small metallic rings B, in order to join together the various links, as has been clearly illustrated in FIGURES 1 and 3 of the drawings.

In one of the edges of the planar portions A of the links L, there is a shoulder or shield directed in a downward direction in an angle of about 45° and indicated by means of the reference letter E. When the links are joined together, as has been clearly illustrated in FIGURES 1 and 3 of the drawings, each shield becomes situated below the facing edge of the adjacent link, and in overlapping relationship therewith so as to form a screen or barrier preventing the passage of flames (from burners not shown between the upper and lower belts), out through the slits S that exist between one link L and the other. By containing these flames, the various products on the belts may be baked in a uniform manner, without wasting the heat uselessly.

The belt constructed in accordance with the present invention, runs on an adequate number of pulleys D, having a cylindrically shaped body G, as has been clearly illustrated in FIGURES 4 and 5 of the drawings, and which have throughout their periphery a groove F, directed centrally and circumferentially, having a sufficient depth to allow the free passage of the rings B, as is illustrated in FIGURES 4 and 5 of the drawings, so as not to interfere with the rings mentioned.

The above assures a perfect contact between the lower surfaces of the curved portions A' of the laminated links and the rim R of the rolls or pulleys D, since this rim has furthermore an effective width for covering the whole space covered by said curved portion A', in order to provide an appropriate friction surface. The groove or throat F gives a free passage to the rings B, so that the total extent of the face of the curved portions A' of the links are in firm frictional contact against the rim R of pulley D, thus assuring a uniform and adequate movement of the belt.

Of course, there are disposed four pulleys D of the same nature as disclosed heretofore and joined together by means of shafts integral therewith, being one pair of these pulleys impulsing and the other pair impulsed, by conventional means for this type of transmission (not shown).

Since the shields E are directed in a 45° angle downwardly projecting, when they rotate the belt as has been clearly illustrated in FIGURES 4 and 5 of the drawings, they provide a free passage for the subsequent link, without any interference, whereas in the straight strands of the belt, as is illustrated in FIGURES 1 and 3 of the drawings, they are disposed in such a manner that they form an overlapping with said edges, in order to constitute shields which inhibit the passage of the flames, which produces a greatly uniform and highly efficient heating of the total surface of the baking belt, with the consequent economical and operational advantages.

By the afore-mentioned, it may be clearly seen that an extraordinarily important improvement has been attained in the presently existing baking belts for dough breads, and that the efficiency and operational economy thereof has been incremented, without raising the cost of production, by the belts being constituted by a plurality of laminated links, with appropriate shapes for their passage through the rolls or pulleys and for leaving a completely planar surface in the free strands.

Although the above describes the invention in terms of a particularly preferred embodiment thereof, it is understood that certain changes and modifications may be made without leaving the true scope and spirit of the invention as outlined by means of the accompanying claims.

I claim:

1. An improved movable, flexible belt assembly for transporting by means of spaced rotating pulleys products to be heated comprising:
   a plurality of elongated links,
   each link having a central planar portion and curved end portions,
   said curved end portions having a radius of curvature approximately equal to the radius of curvature of the roating pulleys, and being in frictional engagement with said pulleys in order to be moved by rotation of said pulleys, and
   means connecting each said link to adjacent links whereby the central portion of each link forms with adjacent central portions of adjacent links a planar flexible belt between said spaced pulleys.

2. The improved belt assembly in accordance with claim 1, wherein said connecting means includes metal rings introduced through the registering openings positioned proximate to the edges of said curved end portions.

3. The improved baking belt assembly in accordance with claim 1, wherein one of the edges of said central planar portion of said links includes a shoulder connected to said link and projecting downwardly in overlapping relationship to the edge of the immediately adjacent link to prevent the passage of the flames between said belt.

4. The belt assembly in accordance with claim 1, including a plurality of pulleys, each pulley having a cylindrical body, and a peripheral rim provided with a continuing groove, said groove having a width and a depth sufficient to receive said connecting means.

5. The improved belt assembly as set forth in claim 1, wherein said connecting means includes metal rings introduced through the registering openings positioned proximate to the edges of said curved end portions, one of the edges of said central planar portion of said links including a shoulder connected to said link and projecting downwardly in overlapping relationship to the edge of the immediately adjacent link to prevent the passage of the flames between said belt, including a plurality of pulleys, each pulley having a cylindrical body, and a peripheral rim provided with a continuing groove, said groove having a width and a depth sufficient to receive said connecting means.

6. The improved belt assembly of claim 3, wherein said shoulder is directed at approximately a 45° angle from said central planar portion.

References Cited by the Examiner
UNITED STATES PATENTS
3,034,638  5/1962  Franz _____ 198—195

EVON C. BLUNK, *Primary Examiner.*
A. C. HODGSON, *Assistant Examiner.*